US008472732B2

(12) United States Patent
Pallister

(10) Patent No.: US 8,472,732 B2
(45) Date of Patent: *Jun. 25, 2013

(54) LOW-LATENCY REMOTE DISPLAY RENDERING USING TILE-BASED RENDERING SYSTEMS

(75) Inventor: Kim Pallister, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 4 days.

This patent is subject to a terminal disclaimer.

(21) Appl. No.: 13/287,245

(22) Filed: Nov. 2, 2011

(65) Prior Publication Data

US 2012/0044253 A1 Feb. 23, 2012

Related U.S. Application Data

(60) Continuation of application No. 12/884,456, filed on Sep. 17, 2010, which is a division of application No. 10/951,749, filed on Sep. 27, 2004, now Pat. No. 7,813,562.

(51) Int. Cl.
*G06K 9/36* (2006.01)
*G06K 9/46* (2006.01)

(52) U.S. Cl.
USPC .......................................... 382/232; 382/304

(58) Field of Classification Search
USPC .................................. 382/232, 234, 303, 304
See application file for complete search history.

(56) References Cited

U.S. PATENT DOCUMENTS

| 6,167,442 | A | * | 12/2000 | Sutherland et al. | 709/217 |
|---|---|---|---|---|---|
| 6,182,127 | B1 | * | 1/2001 | Cronin et al. | 709/219 |
| 6,356,283 | B1 | | 3/2002 | Guedalia | |
| 6,449,639 | B1 | | 9/2002 | Blumberg | |
| 6,603,471 | B2 | | 8/2003 | Pallister | |
| 7,180,523 | B1 | | 2/2007 | Macri et al. | |
| 7,302,001 | B2 | * | 11/2007 | Wang et al. | 375/240.1 |
| 8,208,741 | B2 | * | 6/2012 | Pallister | 382/232 |
| 2002/0015042 | A1 | | 2/2002 | Robotham et al. | |
| 2003/0163477 | A1 | * | 8/2003 | Visharam et al. | 707/100 |
| 2004/0078491 | A1 | | 4/2004 | Gormish et al. | |
| 2004/0220707 | A1 | | 11/2004 | Pallister | |
| 2004/0252129 | A1 | | 12/2004 | Pallister | |
| 2005/0140688 | A1 | | 6/2005 | Pallister | |
| 2005/0140689 | A1 | | 6/2005 | Pallister | |

FOREIGN PATENT DOCUMENTS

WO 2006/036661 A1 6/2006

OTHER PUBLICATIONS

Humphreys, et al., "WireGL: A Scalable Graphics System for Clusters", Proceedings of SIGGRAPH, 2001, pp. 129-140.
Humphreys, et al., "Distributed rendering for scalable displays", IEEE Supercomputing, 2000, 8 pages.

(Continued)

*Primary Examiner* — Phuoc Tran
(74) *Attorney, Agent, or Firm* — Robert D. Hinchliffe

(57) ABSTRACT

Apparatus, systems and methods for low latency remote display rendering using tile-based rendering systems are disclosed. In one implementation, a system includes a network interface and a content source coupled to the network interface. The content source being capable of rendering at least one tile of a tiled image, encoding the at least one tile, and providing the at least one encoded tile to the network interface before all tiles of the tiled image are rendered.

12 Claims, 3 Drawing Sheets

OTHER PUBLICATIONS

Humphreys, et al., "Chromium: A Stream Processing Framework for Interactive Rendering on Clusters", In Proceedings of SIGGRAPH, 2002, pp. 693-702.

Igehy, et al., "The design of a parallel graphics interface", Proceedings of SIGGRAPH, 1998, pp. 141-150.

Bethel, et al., "Sort-First Distributed Memory Parallel Visualization and Rendering", IEEE Symposium on Parallel and Large-Data Visualization and Graphics, Oct. 20-21, 2003, pp. 41-50.

Buck, et al., "Tracking graphics state for networked rendering", Proceedings of SIGGRAPH/Eurographics Workshop on Graphics Hardware, 2000, pp. 87-95.

Delgado, et al., "Mind: A Tiled Display Visualization System At CATE/FIU", Accessed on Jul. 5, 2007, 6 pages available at: http://chromium.sourceforge.net/doc/index.html.

Paul, et al., "What's New in Chromium", Tungsten Graphics, Inc., Apr. 28, 2004, 27 pages.

International Preliminary Report on Patentability and Written Opinion received for PCT Patent Application No. PCT/US2005/033655, mailed on Apr. 5, 2007, 8 pages.

Office Action received for Chinese Patent Application No. 200510119988.4, mailed on Apr. 28, 2010, 16 pages of Chinese Office Action including 11 pages of English Translation.

Office Action Received for Chinese Patent Application No. 200510119988.4, mailed on Nov. 30, 2007, 17 pages of Chinese Office Action including 11 pages of English Translation.

Office Action received for Chinese Patent Application No. 200510119988.4, mailed on Aug. 12, 2011, 8 pages of Chinese Office Action including 5 pages of English Translation.

International Search Report received for PCT Patent Application No. PCT/US2005/033655, mailed on Jan. 31, 2006, 3 pages.

Martinez, et al., "Object Browsing Using the Internet Imaging Protocol", Computer Networks, Elsevier Science Publishers B.V., Amsterdam, NL, vol. 33, No. 1-6, Jun. 2000, pp. 803-810.

POWERVR, "POWERVR MBX Technology Overview", 1.5f (POWERVR SDK 2.05.25.0295), Imagination Technologies Ltd., May 6, 2009, 17 pages.

* cited by examiner

LOW-LATENCY REMOTE DISPLAY RENDERING USING TILE-BASED RENDERING SYSTEMS

CROSS-REFERENCE TO RELATED APPLICATION

This application is a continuation of U.S. application Ser. No. 12/884,456, filed on Sep. 17, 2010, and entitled "Low-Latency Remote Display Rendering Using Tile-Based Rendering Systems" which is divisional of U.S. application Ser. No. 10/951,749, filed on Sep. 27, 2004, and entitled "Low-Latency Remote Display Rendering Using Tile-Based Rendering Systems", now U.S. Pat. No. 7,813,562, issued on Oct. 12, 2010, which applications are incorporated herein by reference in their entirety.

BACKGROUND

In a remote display rendering system a remote server may send image data over a network for viewing by a user on a local display. Typically, a remote software application associated with the server renders, encodes and transmits the image data one frame at a time. The local user then decodes and displays the frames as they are received. The rate at which the local user receives the image frames is limited in part by the latency of the network. Some applications that use remote display rendering, such as 3D games, may demand low-latency timing between a user's input (i.e., the user pressing a controller button) and the displaying of the resulting action (i.e., user's game character changes orientation). In such circumstances excessive network latency may impair the end-user game experience when game scene images are transmitted frame-by-frame.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art, having the benefit of the present disclosure, that the various aspects of the invention claimed may be practiced in other examples that depart from these specific details. In certain instances, descriptions of well known devices, circuits, and methods are omitted so as not to obscure the description of the present invention with unnecessary detail.

Figure 1:
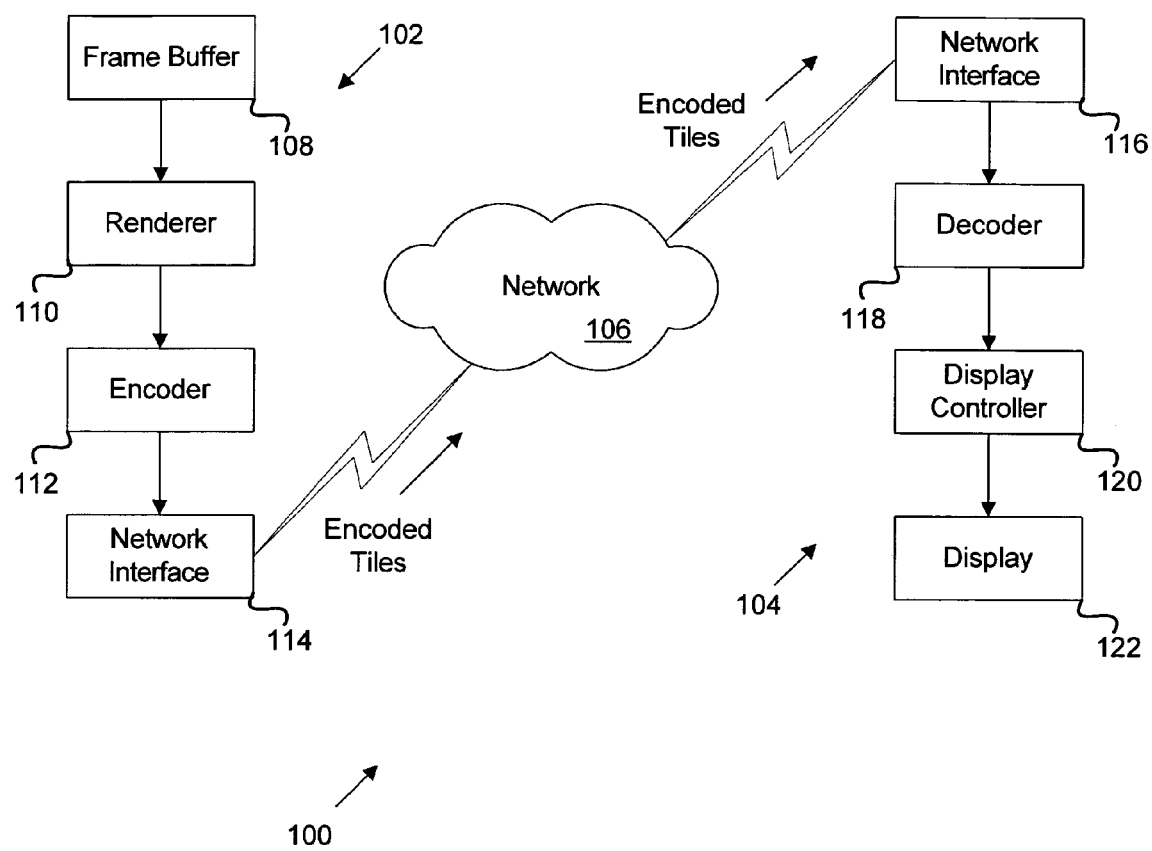
FIG. 1 illustrates an example system.

FIG. 1 illustrates an example system 100 according to one implementation of the invention. System 100 may include a remote graphics and/or video content source 102, a local terminal 104 and a network 106 communicatively coupling source 102 with terminal 104. Source 102 may include a frame buffer 108, a renderer 110, and an encoder 112. A network interface 114 may communicatively couple source 102 to network 106. Terminal 104 may include a network interface 116, a decoder 118, a display controller 120 and a display 122.

Frame buffer 108 may be any device capable of holding and/or storing one or more frames of image data. Although illustrated as a physical device, buffer 108 may be embodied in hardware, software, firmware or any combination thereof without departing from the scope and spirit of the invention. In one implementation, buffer 108 may be provided with image data by a software application (not shown) that creates graphics and/or video data on the fly such as a 3D gaming application, although the invention is not limited in this regard. Alternatively, in another implementation, image frame data may be provided to buffer 108 by a source of stored image data (not shown).

Renderer 110 may be embodied in an integrated circuit (IC) and/or a collection of ICs capable of accepting graphics and/or video content from buffer 108 and rendering the content into a format suitable for transmission to local terminal 104. In another embodiment, renderer 110 may be embodied in software and/or firmware. In one implementation, renderer 110 generates image data in a particular bitmap format such as red-green-blue (RGB), although the invention is not limited in this regard and the claimed invention contemplates other image data formats.

Encoder 112 may convert the image data output of renderer 110 into a compressed format appropriate for efficient communication over network 106 to local terminal 104. In one implementation, encoder 112 may convert the RGB image data provided by renderer 110 into a Joint Photographic Experts Group (JPEG) compatible format, although the invention is not limited in this regard. For example, in one implementation, encoder 112 may convert the RGB image data into a YUV data format and then compress the YUV image data into an JPEG compatible format such as 4:2:2 YUV or 4:1:1 YUV using well known techniques. In another implementation, encoder 112 may use well known techniques to run-length encode the RGB image data provided by renderer 110. Clearly many such combinations of image data format conversion and/or encoding are possible and are contemplated by the claimed invention.

Network interface 114 may communicatively couple source 102 to network 106 and may comprise any network interface such as a wired interface and/or a wireless interface suitable for conveying compressed image data onto network 106. For example, in one implementation, interface 114 may be a wireless local area network (WLAN) interface, although the invention is not limited in this regard.

The components of content source 102 may be embodied in hardware, software, firmware or any combination thereof without departing from the scope and spirit of the invention. Moreover, the components of content source 102 need not be located together in a single device but one or more of buffer 108, renderer 110, and/or encoder 112 may be located in physically separate devices that are communicatively and/or operatively coupled together. Alternatively, content source 102 may be embodied within a single device including one or more ICs that provide the functionality of buffer 108, renderer 110, and/or encoder 112 as described. In one implementation, the components of source 102 may be embodied in a web server. In another implementation, a software application may generate image tiles and supply them directly to renderer 110 without first storing the image tiles in a frame buffer.

Network 106 may be any content delivery network capable of communicating and/or providing compressed image data from content source 102 to terminal 104. In one implementation, network 106 may comprise the global internet or world-wide web. However, the exact nature of network 106 does not limit the present invention. For example, network 106 could be a wired and/or wireless non-global, local area network (LAN) or a wide area network (WAN) without limiting the claimed invention. In implementations where network 106 may be a wired and/or wireless LAN and/or WAN the descriptors "remote" and "local" applied to source 102 and terminal 104 respectively are relative and may signify that source 102 and terminal 104 are physically separated by a relatively short distance. For example, in an implementation where network 106 may be a wireless LAN, source 102 and terminal 104 may only be separated by a few feet.

Network interface 116 may communicatively couple terminal 104 to network 106 and may comprise any network interface such as a wired interface and/or a wireless interface suitable for conveying compressed image data from network 106 to terminal 104. For example, in one implementation, interface 116 may be a wireless local area network (WLAN) interface, although the invention is not limited in this regard.

Decoder 118 may decompress the compressed image data generated by source 102 and received from network 106 via interface 116. In one implementation, decoder 118 may decompress the encoded MPEG-compatible format image data and provides that decompressed data to display controller 120, although the invention is not limited in this regard. For example, in one implementation, decoder 118 may decompress the YUV image data from the sub-sampled 4:2:2 YUV format into fully sampled YUV format using well known techniques. In another implementation, decoder 118 may decompress run-length encoded RGB data using well known techniques. Clearly many such combinations of image decoding are possible and are contemplated by the claimed invention.

Display controller 120 may be any display controller suitable for converting image data provided by decoder 118 into a format appropriate for use by display 122. In one implementation, display controller 120 may convert YUV image data received from decoder 118 into an RGB format, although the invention is not limited in this regard. Likewise, display 122 may be any display capable of displaying image data. In one implementation, display 122 may be a liquid crystal display (LCD) compatible with displaying image data in the RGB format, although the invention is not limited in this regard.

The components of terminal 104 may be embodied in hardware, software, firmware or any combination thereof without departing from the scope and spirit of the claimed invention. Moreover, the components of terminal 104 need not be located together in a single device but one or more of network interface 116, decoder 118, display controller 120 and/or display 122 may be located in physically separate devices that are communicatively and/or operatively coupled together. Alternatively, one or more components of terminal 104 may be embodied within a single device including one or more ICs that provide the functionality of interface 116, decoder 118, display controller 120 and/or display 122 as described. In one implementation, the components of terminal 104 may be embodied in a single personal computing device such as a notebook and/or a desktop computer.

In one implementation, buffer 108 may hold, contain and/or provide graphics and/or video data in a tiled format. For example, an image comprising 640 pixels by 480 pixels may be divided into 300 contiguous tiles each having dimensions of 32 pixels by 32 pixels. In one implementation, renderer 110 may render image data provided by buffer 108 one tile at a time and, once rendered, supply each tile to encoder 112. In this manner content source 102 may provide individual encoded tiles to terminal 104 as will be described in more detail below.

Figure 2:
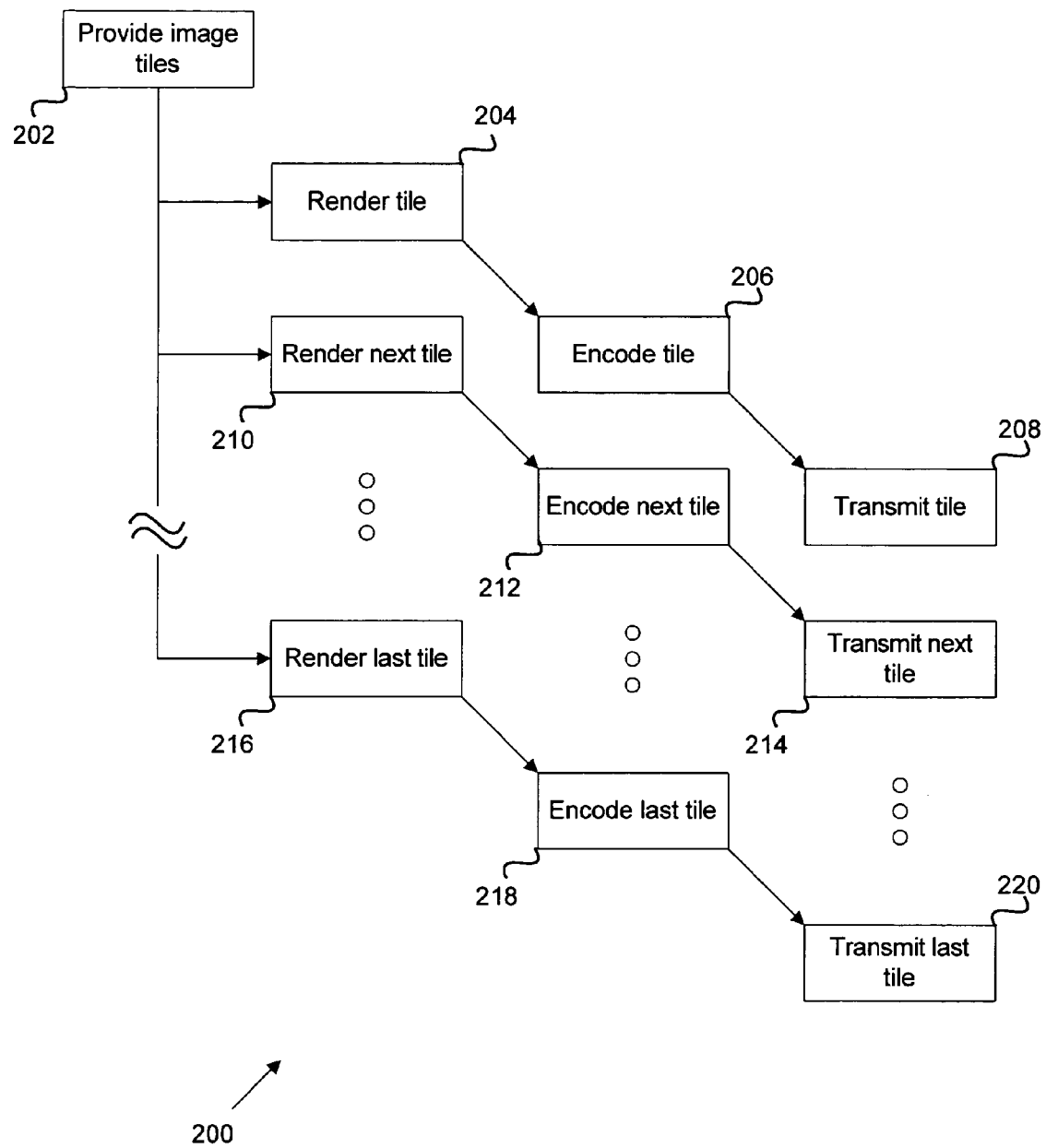
FIG. 2 is a flow chart illustrating an example process of providing and transmitting encoded image tiles.

FIG. 2 is a flow chart illustrating a process 200 of providing and transmitting encoded image tiles. Although process 200 may be described with regard to system 100 of FIG. 1, the claimed invention is not limited in this regard. Processing may begin by providing image tiles [act 202]. One way to do this is by having a software application supply a tiled image frame to frame buffer 108. Processing may continue with the rendering of a tile of the image frame [act 204] and the encoding of the rendered tile [act 206]. In one implementation, renderer 110 may render a tile of the tiled image frame provided by buffer 108 and supply that rendered tile to encoder 112 for encoding. Processing may continue with the transmission of the encoded tile [act 208]. This may be done by having encoder 112 supply the encoded tile to network interface 114. Interface 114 may then transmit the encoded tile to terminal 104 over network 106.

Because system 100 my provide graphics and/or video data in tiled format, process 200 may provide for the rendering, encoding and/or transmission of multiple tiles of a tiled image in a pipelined and/or substantially parallel manner. In other words, process 200 may allow network interface 114 to transmit one or more encoded image tiles over network 106 separately from others of the encoded image tiles of the graphics and/or video image data being provided to network interface 114 by encoder 112. Thus, in one implementation, network interface 114 may transmit one or more encoded image tiles over network 106 before renderer 110 has rendered all image tiles of the graphics and/or video data image stored in buffer 108. However, this is merely an example of how process 200 may provide for the rendering, encoding and/or transmission of multiple tiles of a tiled image in a pipelined and/or substantially parallel manner and implementation of the present invention is not limited in these respects. For example, in another implementation, network interface 114 may transmit one or more encoded image tiles over network 106 before encoder 112 has encoded all image tiles of the graphics and/or video data image stored in buffer 108 and rendered by renderer 110.

In one implementation, after renderer 110 has rendered a tile in act 204, processing may continue with the rendering of a next tile [act 210]. Thus, subsequent to rendering a tile in act 204, renderer 110 may render a next tile in act 210. The next tile may then be encoded [act 212] and transmitted [214]. In one implementation, after encoder 112 has encoded the tile in act 206, encoder 112 may encode the next tile in act 212. Similarly, after interface 114 has transmitted the tile in act 208, interface 114 may transmit the next tile in act 214. Process 200 may continue in a similar fashion with the pipelined or substantially parallel rendering, encoding and transmission of all tiles in the image frame until the last tile in the image frame is rendered, encoded and transmitted in acts 216-220.

Figure 3:
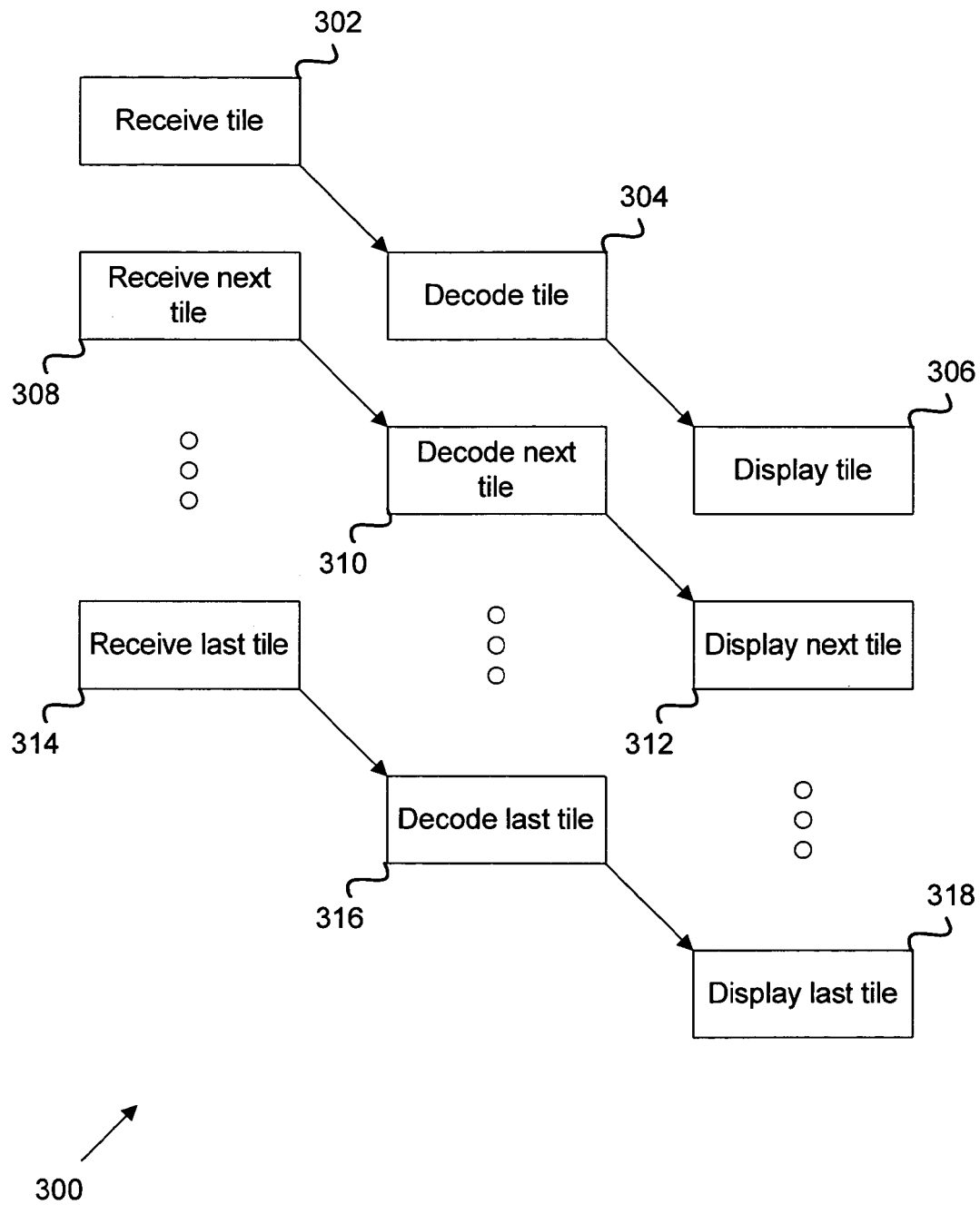
FIG. 3 is a flow chart illustrating an example process of receiving encoded image tiles.

FIG. 3 is a flow chart illustrating a process 300 of receiving and displaying encoded image tiles. Although process 300 may be described with regard to system 100 of FIG. 1, the claimed invention is not limited in this regard. Processing may begin by receiving an encoded image tile [act 302]. One way to do this is by having network interface 116 receive the encoded image tile from network 106. Processing may continue with the decoding of the encoded image tile [act 304] received in act 302. In one implementation, decoder 118 may decode the encoded image tile provided by network interface 116. Processing may continue with the display of the decoded tile [act 306]. This may be done by having decoder 118 supply the decoded tile to display controller 120. Controller 120 may then process the decoded image tile and supply the resulting image tile data to display 122.

Because system 100 my provide graphics and/or video data in tiled format, process 300 may provide for the reception, decoding and display of multiple tiles of a tiled image in a pipelined and/or substantially parallel manner. In other words, process 300 may allow network interface 116 to receive one or more encoded image tiles from network 106 separately from others of the encoded image tiles of the graphics and/or video image data being transmitted over network 106 by interface 114. Thus, in one implementation, network interface 116 may receive one or more encoded image tiles over network 106 before renderer 110 has rendered all image tiles of the graphics and/or video data image stored in buffer 108. However, this is merely an example of how process 300 may provide for the reception, decoding and/or display of multiple tiles of a tiled image in a pipelined and/or substantially parallel manner and implementation of the present invention is not limited in these respects. For example, in another implementation, network interface 116 may receive one or more encoded image tiles over network 106 before encoder 112 has encoded all image tiles of the graphics and/or video data image stored in buffer 108 and rendered by renderer 110.

In one implementation, after interface 116 has received a tile in act 302, processing may continue with the receiving of a next tile [act 308]. Thus, subsequent to receiving an encoded tile in act 302, interface 116 may receive a next encoded tile in act 308. The next encoded tile may then be decoded [act 310] and displayed [312]. In one implementation, after decoder 118 has decoded [act 304] the first tile received in act 302, decoder 118 may decode the next tile in act 310. Similarly, after controller 120 has processed the decoded image tile for display in act 306, controller 120 may process the next decoded image tile for display in act 312. Process 300 may continue in a similar fashion with the pipelined or substantially parallel receiving, decoding and display of all tiles in the image frame until the last tile in the image frame is received, decoded and displayed in acts 314-318.

The acts shown in FIG. 2 and/or FIG. 3 need not be implemented in the order shown; nor do all of the acts necessarily need to be performed. Also, those acts that are not dependent on other acts may be performed in parallel with the other acts. Further, at least some of the acts in this figure may be implemented as instructions, or groups of instructions, implemented in a machine-readable medium.

The foregoing description of one or more implementations consistent with the principles of the invention provides illustration and description, but is not intended to be exhaustive or to limit the scope of the invention to the precise form disclosed. Modifications and variations are possible in light of the above teachings or may be acquired from practice of various implementations of the invention. For example, the system, apparatus and methods for low latency remote display rendering using tile-based rendering systems is not limited to systems or apparatus providing JPEG-compatible encoding or decoding. Rather, the claimed invention also contemplates other protocols capable of supporting low latency remote display rendering using tile-based rendering systems. Moreover, while FIGS. 2 and 3 and the accompanying text may describe a process for rendering, encoding, transmitting, receiving, decoding and displaying individual tiles, other processes are contemplated by the claimed invention. For example, in one implementation, two or more tiles at a time may be rendered, encoded, transmitted, received, decoded and displayed in a batch process. In other words, for example, two or more image tiles at a time may be rendered in act 204, encoded in act 206, transmitted in act 208, received in act 302, decoded in act 304 and displayed in act 306 and so on. Clearly, many other implementations may be employed to provide low latency remote display rendering using tile-based rendering systems consistent with the claimed invention.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed is:

1. A device comprising:
   a frame buffer to store an image, the image including at least a first image tile and a second image tile;
   a renderer responsive to the frame buffer, the renderer to render the first image tile; and
   an encoder responsive to the renderer, the encoder to encode the first image tile and to provide the encoded first image tile to a network interface before the renderer has rendered the second image tile;
   wherein the first image tile has a height multiple pixel rows and a width of multiple pixel columns.

2. The device of claim 1, the encoder further to provide the encoded first image tile to the network interface substantially in parallel with the renderer rendering the second image tile.

3. The device of claim 2, the encoder further to encode the second image tile.

4. The device of claim 3, the encoder further to provide the encoded second image tile to the network interface after providing the encoded first image tile to the network interface.

5. A method, comprising:
   storing an image in a frame buffer, the image including at least a first image tile and a second image tile;
   responsive to the frame buffer, rendering the first image tile to generate a first rendered image tile;
   encoding the first rendered image tile to generate a first encoded image tile; and
   providing the first, encoded image tile to a network interface before rendering the second image tile;
   wherein the first image tile has a height of multiple pixel rows and a width of multiple pixel columns.

6. The method of claim 5, wherein said providing comprises:
   providing the first encoded image tile to the network interface substantially in parallel with rendering the second image tile.

7. The method of claim 5, further comprising:
   rendering the second image the to generate a second rendered image tile; and
   encoding the second rendered image tile to generate a second encoded image tile.

8. The method of claim 7, further comprising providing the second encoded image tile to the network interface after providing the first encoded image tile to the network interface.

9. An article comprising one or more non-transitory computer readable media having stored thereon instructions that, when executed by a computer, cause the computer to:
- store an image in a frame buffer, the image including at least a first image tile and a second image tile;
- responsive to the frame buffer, render the first image tile to generate a first rendered image tile;
- encode the first rendered image the to generate a first encoded image tile; and
- provide the first encoded image tile to a network interface before rendering the second image tile;
- wherein the first image tile has a height of multiple pixel rows and a width of multiple pixel columns.

10. The article of claim 9, wherein said instructions to provide cause the computer to provide the first encoded image tile to the network interface substantially in parallel with rendering the second image tile.

11. The article of claim 9, further having stored thereon instructions that, when executed by a computer, cause the computer to:
- render the second image tile to generate a second rendered image tile; and
- encode the second rendered image tile to generate a second encoded image tile.

12. The article of claim 11, further having stored thereon instructions that, when executed by a computer, cause the computer to provide the second encoded image tile to the network interface after providing the first encoded image tile to the network interface.

* * * * *

UNITED STATES PATENT AND TRADEMARK OFFICE
CERTIFICATE OF CORRECTION

PATENT NO. : 8,472,732 B2  Page 1 of 1
APPLICATION NO. : 13/287245
DATED : June 25, 2013
INVENTOR(S) : Kim Pallister It is certified that error appears in the above-identified patent and that said Letters Patent is hereby corrected as shown below:

In the Claims

Column 6, line 36, claim 1, "wherein the first image tile has a height multiple pixel rows" should be changed to --wherein the first image tile has a height of multiple pixel rows--

Column 6, line 54, claim 5, "providing the first, encoded image tile" should be changed to --providing the first encoded image tile--

Column 6, line 64, claim 7, "rendering the second image tile the to generate" should be changed to --rendering the second image tile to generate--

Column 7, line 12, claim 9, "encode the first rendered image tile the to generate" should be changed to --encode the first rendered image tile to generate--

Signed and Sealed this
Seventh Day of January, 2014

Margaret A. Focarino
*Commissioner for Patents of the United States Patent and Trademark Office*